United States Patent
Pershin et al.

(10) Patent No.: US 8,037,032 B2
(45) Date of Patent: Oct. 11, 2011

(54) MANAGING BACKUPS USING VIRTUAL MACHINES

(75) Inventors: Aleksey Pershin, Fremont, CA (US); Ilia Langouev, Santa Cruz, CA (US); Sudarsana R. Piduri, Santa Clara, CA (US); Parag Ratankumar Shah, San Jose, CA (US); Joshua M. Silver, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 640 days.

(21) Appl. No.: 12/197,768

(22) Filed: Aug. 25, 2008

(65) Prior Publication Data

US 2010/0049930 A1     Feb. 25, 2010

(51) Int. Cl.
    *G06F 17/00* (2006.01)
(52) U.S. Cl. ........ 707/681; 707/602; 707/610; 707/646; 707/649; 707/662; 707/672; 707/683; 707/684; 707/685; 707/690; 707/695; 707/698; 718/1
(58) Field of Classification Search .................. 707/602, 707/610, 646, 649, 662, 672, 681, 683, 684, 707/685, 690, 695, 698; 718/1
See application file for complete search history.

(56) References Cited

U.S. PATENT DOCUMENTS

| | | | |
|---|---|---|---|
| 7,370,164 B1 * | 5/2008 | Nagarkar et al. | 711/162 |
| 2007/0094659 A1 * | 4/2007 | Singh et al. | 718/1 |
| 2007/0271428 A1 * | 11/2007 | Atluri | 711/162 |
| 2009/0222496 A1 * | 9/2009 | Liu et al. | 707/204 |

* cited by examiner

*Primary Examiner* — Etienne Leroux
*Assistant Examiner* — Bruce Witzenburg (57) ABSTRACT

One embodiment is a method for providing incremental backups for a source computing machine, the method including: (a) creating a first backup snapshot including a virtual machine (VM) snapshot of an initial copy of a source computing machine volume, wherein said VM snapshot includes a timestamp and a first redo log file; (b) reconfiguring and customizing said first backup snapshot to create a first bootable VM, writing changes associated with said reconfiguring and customizing into said first redo log file, then creating a first bootable snapshot including a VM snapshot of said first bootable VM, wherein said VM snapshot of said first bootable VM includes a timestamp for said first bootable VM and a redo log file; (c) performing an incremental update of said first backup snapshot or a subsequent backup snapshot, then creating a subsequent backup snapshot including a VM snapshot of said incremental update, wherein said VM snapshot of said incremental update includes a timestamp for said incremental update and a redo log file; and (d) reconfiguring and customizing said subsequent backup snapshot to create a subsequent bootable VM, then creating a subsequent bootable snapshot including a VM snapshot of said subsequent bootable VM, wherein said VM snapshot of said subsequent bootable VM includes a timestamp for said subsequent bootable VM and a redo log file.

18 Claims, 5 Drawing Sheets

MANAGING BACKUPS USING VIRTUAL MACHINES

FIELD OF THE INVENTION

One or more embodiments of the present invention relate to the field of computer software and, in particular, to methods for managing backups using virtual machines.

BACKGROUND

As data storage systems become ever bigger, providing efficient backup storage becomes increasingly important. Even if one is not concerned with the cost of the needed storage space, the time required to perform all the necessary copy operations becomes increasingly burdensome. For a large system, a full backup procedure can be time-consuming, requiring several hours or even days to complete. For this reason, backup procedures often provide "incremental" backups where only blocks or files which have changed since the last backup are copied. Typically, a full backup procedure is performed at infrequent intervals (for example, at an initial time followed by long intervals such as once per month). Thereafter, incremental backups are created more frequently, for example, once per day. Examples of commercial incremental backup products include TRUE IMAGE™ from ACRONIS®, Inc. and NORTON GHOST™ from Symantec Corporation.

Backups can be used for a variety of purposes. They can be used to recover from user error when, for example, the user inadvertently deletes or overwrites a file. They can be used to recover from data loss due to hardware failure such as a hard disk failure. They can also be used to recover from software failures such as application or operating system crashes. The goal of recovery after a crash is to restore the last available known good operating state for the complete system. This can be done by rebooting the same hardware after restoring the file system from a suitable backup, but the recovery procedure can be very time-consuming if the entire file system must be restored. For this reason, virtual machines (VMs) are sometimes used for backup purposes. When a VM is used for backup purposes, it is typically not used as a running machine unless and until it is needed for restoring a failed machine. Typically, the VM is launched, booted, and tested only to verify functionality and then it is shut down; however, it can be brought back on-line quickly if and when needed to replace the failed source machine for which it is functioning as a backup.

Using a VM as a backup is useful in that, if the source machine goes down, the VM can be quickly powered on in its place. With traditional backup methods, a full system restore can take hours, while the VM can be up and running in a few minutes. But whether using traditional file system backups or VMs as backups, changes made since the last backup procedure are lost. Examples of commercial products that enable VMs to be used for backup include POWERCONVERT™ from PLATESPIN®, Ltd. and VEEAM BACKUP™ from Veeam Software.

SUMMARY

One or more embodiments of the present invention are methods for providing incremental backups for a source computing machine. In particular, one such embodiment is a method that comprises: (a) creating a first backup snapshot comprising a virtual machine (VM) snapshot of an initial copy of a source computing machine volume, wherein said VM snapshot comprises a timestamp and a first redo log file; (b) reconfiguring and customizing said first backup snapshot to create a first bootable VM, writing changes associated with said reconfiguring and customizing into said first redo log file, then creating a first bootable snapshot comprising a VM snapshot of said first bootable VM, wherein said VM snapshot of said first bootable VM comprises a timestamp for said first bootable VM and a redo log file; (c) performing an incremental update of said first backup snapshot or a subsequent backup snapshot, then creating a subsequent backup snapshot comprising a VM snapshot of said incremental update, wherein said VM snapshot of said incremental update comprises a timestamp for said incremental update and a redo log file; and (d) reconfiguring and customizing said subsequent backup snapshot to create a subsequent bootable VM, then creating a subsequent bootable snapshot comprising a VM snapshot of said subsequent bootable VM, wherein said VM snapshot of said subsequent bootable VM comprises a timestamp for said subsequent bootable VM and a redo log file.

DETAILED DESCRIPTION

As is well known, a virtual machine (VM) is a software abstraction, or "virtualization," of an actual physical computer system. A VM typically has a "guest" operating system (OS) of its own such as, for example, a WINDOWS® OS, a LINUX OS, or an OS-X OS.

One or more embodiments of the present invention are methods for managing backups of source computing machines (either physical machines or VMs) using VMs (note that a source computing machine is sometimes referred to herein as a source machine or as a source system). In accordance with one or more such embodiments, a backup can be for an entire source machine, including an operating system and all volumes of all disks associated with the source machine, or it can be for selected volumes of selected disks according to the needs and desires of a user. For example, a source machine with a large file system comprising multiple disks and volumes may serve both critical and non-critical roles. The user can choose to use VM backup methods to back up only those volumes necessary for critical roles, namely volumes containing the operating system and certain application-specific files. Non-critical files and volumes can be backed up separately, for example, on a less frequent schedule using a backup method that does not create VMs. Such separation into critical and non-critical backups can reduce the overhead and time required to create and maintain a backup for critical files, thereby enabling more frequent backup of the critical files.

Typically, in accordance with one or more embodiments of the present invention, a full backup procedure is carried out at infrequent intervals (an initial time followed by intervals such as, for example and without limitation, once per month). Thereafter, incremental backups can be created more frequently, for example, once per day, or even once every few minutes, provided resources and time required to carry out an incremental backup procedure is small enough.

In accordance with one or more embodiments of the present invention, the full backup procedure is carried out by converting the source computing machine to a VM, for example and without limitation, using methods that can be used to create a clone VM from a source machine. For example, one such method is performed by VMWARE CONVERTER™ with or without P2VMOTION™ from VMware, Inc. This conversion is commonly referred to as "P2V conversion" (physical-to-virtual conversion), although the source machine can also be a VM. This full backup procedure can take several hours, if not days. As such, usually, it will be scheduled to occur at regular intervals. Full backups typically require relatively large amounts of storage space, and users (for example, system administrators) may not wish to maintain copies of successive full backups indefinitely. For example, each new VM thusly created can be stored during creation as a temporary VM, and then renamed to replace a runnable backup VM once the full backup procedure is complete. Alternatively, a series of two or more timestamped VMs can be maintained to allow roll-back to a machine state at a choice of times.

Using incremental backups can reduce storage requirements and reduce, and even minimize, time between carrying out backup procedures, thereby reducing the potential amount of lost data. As with traditional incremental backup procedures, a backup procedure using a VM as an incremental backup only transfers changed blocks or files, thereby reducing overall backup time. This reduces the amount of data that must be transferred over a network to a target datastore and the load on the source computing machine to read and send the data, as well as the load on the destination machine to receive and store the data. Use of an incremental backup procedure can also enable a user to schedule more frequent running of the backup procedure: for example, once per hour or even more frequently, thereby reducing the amount of data that would be lost when it is necessary to use the backup VM due, for example, to a crash of the source computing machine. An additional benefit of using VMs for backup is that a user can test the backup VM between scheduled backup procedures, if desired, without disrupting the source computing machine.

Figure 1:
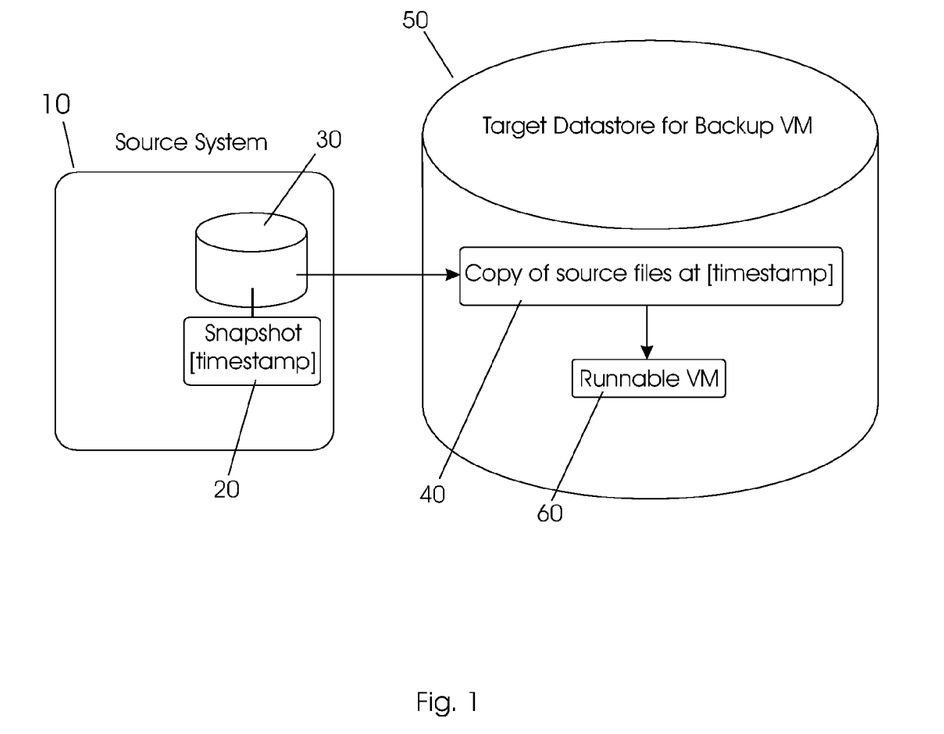
FIG. 1 helps illustrate steps involved in converting a running source machine to a virtual machine (VM).

In accordance with one or more embodiments of the present invention, a source system is a running physical machine, and a full backup procedure is carried out by converting the source system (including all or selected storage volumes thereof) to a VM (for example, without interrupting the activities of the source system). This converting step can use a converter agent (e.g., VMware Converter) which runs on the source system. FIG. 1 shows schematically the conversion of running source system 10 to a VM. As shown in FIG. 1, the conversion comprises steps of: (a) creating source snapshot 20 of source system storage volume 30 (which may be all or a subset of volumes accessed by source system 10); (b) creating a storage location 40 on target datastore 50 for a copy of source system storage volume 30 as it existed at the time defined by source snapshot 20, wherein the target datastore 50 can be accessed by a computing machine (not shown for ease of illustration) that will host the backup VM; (c) copying data specified by source snapshot 20 to source copy 40 on target datastore 50; (d) reconfiguring and customizing source copy 40 to create runnable VM 60; and (f) storing runnable VM 60 on target datastore 50.

For example and without limitation, source snapshot 20 may be created using VSS snapshot (a utility built into WINDOWS® versions since Windows XP) or third party software such as that available from ACRONIS® Inc. or STORAGECRAFT™ Technology Corporation. Source snapshot 20 captures the state of source system 10 volumes at a point in time. As is well known, a "volume" is a portion of a storage medium such as a disk (physical or virtual) that is treated as a unit by an operating system. For example, in WINDOWS operating systems, volumes are designated by "drive" letters. A volume can be all or part of a physical disk, and it can also include portions of multiple disks as, for example, when using Redundant Array of Independent Disks (RAID) storage schemes. A volume is typically "formatted" with a "file system" to enable an operating system to read and write individual files. In addition, a "snapshot" of a volume represents an image of the complete state of a volume at a point in time. A snapshot is usually not a physical copy, since it is undesirable to stop a running machine while a physical copy is made. Instead, a snapshot operation itself usually comprises recording a timestamp, and, thereafter, preserving pre-snapshot versions of all files, including subsequently deleted files. In normal operation, the operating system and application software see only the new version of the file system, including all changed and deleted files, and preserved pre-snapshot versions of files are made available via a special interface. When used in carrying out a backup procedure, a "source snapshot" is typically transient, and it is deleted after completion of the backup procedure. After a source snapshot is created, the source machine continues to write to volume(s) as usual, but any previously-used blocks which would be overwritten are copied into a snapshot file so that they are not lost and can be retrieved via the special interface.

In accordance with one or more further embodiments, the source machine is a VM which is running. The same snapshot methods used for a physical machine can also be used. Alternatively, the host machine for the source VM can create the snapshot file outside of the source VM using additional data storage outside that allocated for the running source VM.

In accordance with one or more embodiments of the present invention, an incremental backup procedure can be performed either at a block level or at a file level. A "block" is a portion of a volume. For backup purposes, it can be convenient to divide a volume into equal-sized blocks (sometimes with an irregular-sized block at the beginning to maintain alignment). The size of the blocks is set at the time the full backup procedure is carried out. While the block size may be arbitrary, it can be convenient to match the block size to a cluster size of the file system on the volume, where a "cluster" is a minimum-sized portion of a file system that can be read or written in a single operation. The cluster size is determined by a file system structure defined by an operating system, for example, when a disk volume is formatted. A typical cluster size is 4 kB, and is typically a multiple of a sector size, where a "sector" is a minimum-sized portion of a volume that can be read or written at a hardware level. For volumes on magnetic disks, a sector size is typically 512 bytes. For volumes on optical disks, a sector size is typically 2 kB. For unrecognized volumes, where the cluster size is not readily apparent, a default block size can be used.

When operating at the block level, the incremental backup procedure determines which blocks have changed since the last backup procedure, and it transfers only the changed blocks. When operating at the file level, the incremental backup procedure determines which files (or portions of files) have changed since the last backup procedure, and transfers only the changed files. In accordance with one or more such embodiments of the present invention, the operating mode (for example, file level or block level) for the incremental backup procedure must be chosen at the time of the first full backup procedure, and it cannot be changed until another full backup is made.

Performing incremental backups at the file level has an advantage of being independent of an underlying file system structure. As such, the source volume can be defragmented, or even restored, from another backup, without affecting the incremental backups. In particular, the incremental backup procedure sees only the contents of each file, and it disregards where the file is actually stored in a volume. However, file-level backup is generally more complex than block-level backup, because there are many file operations besides "read" and "write" (for example, "rename" and "delete") that need to be captured and properly "replayed" on the backup volume. In particular, implementing block level incremental backup is easier than file level incremental backup because, for each block in a volume, the backup procedure only needs to know whether or not the block has changed. There is no need to be aware of any high-level file operations. However, simple defragmentation will cause a large amount of data in the volume to be transferred during the next incremental backup because many blocks will have changed even if files have not. For most users, defragmentation is performed at infrequent intervals and block mode backups are preferable.

In certain embodiments, the volume is not split into equal-sized blocks starting from the very beginning of the volume. For example, when using certain file systems (such as FAT12, FAT16, and FAT32), there is an area at the beginning of the volume that is reserved for file system use, and it is possible for backup blocks to be misaligned with respect to file system clusters, thereby causing a potential doubling of the amount of data that must be transferred during incremental backup procedures. To make sure that backup blocks are aligned with file system clusters, the first backup block on the volume can be of any size (but no larger than the size of the remaining blocks).

In certain other embodiments, for example using NTFS file systems, no alignment is necessary, and the first backup block can have the same size as all other backup blocks. File systems, not requiring alignment (like NTFS) will be used as exemplary to simplify presentation of other aspects of embodiments of the present invention.

In addition to maintaining alignment with respect to any irregularly sized storage area at the beginning of the volume, it can be useful to maintain alignment of groups of clusters. For example, in accordance with one or more embodiments of the present invention, the backup procedure can use stored information about which blocks are currently in use. In accordance with one or more such embodiments, a set of bits is stored where each bit represents whether or not a particular block is in use, and the backup procedure can process only blocks whose corresponding bit indicates that it is in use. For example and without limitation, these bits can be grouped into bytes (8 bits), and it can be computationally convenient to keep backup blocks aligned on 8-cluster boundaries so that in-use indicator bytes remain aligned.

An incremental backup procedure must first determine which blocks or files have changed since the last backup (whether full or incremental). In accordance with one or more embodiments of the present invention, to determine whether a particular block needs to be copied during the next incremental backup, hashes are calculated for each block. A hash is a relatively small integer that is calculated by a pre-defined formula from a set of data, where "relatively small" is measured by comparison to the size of the dataset since the hash ought to take less storage, and preferably significantly less storage, than the dataset for it to be useful. Hashes are designed so that any change in the set of data is likely to result in a different hash. There are many specific algorithms that can be used depending on the nature of the data, possible errors or differences, and the application. Thus, any hash algorithm that gives a suitably high probability of generating a unique value for each block may be used as long as any changes made to a block are likely to cause a different number to be generated. Tradeoffs can be made between higher probability of uniqueness on the one hand and algorithm complexity and hash length on the other hand. For example, the SHA-256 algorithm produces a 256-bit (32-byte) number that provides robust detection of differences between blocks while not requiring excessive storage or calculation time. For typical file systems, the cluster size is 4 kB (4096 bytes), and the total storage space required for the hash values is 32/4096=0.8% of the file system size.

In accordance with one or more such embodiments, blocks that have the same hash values are assumed to be the same and are not transferred. If a block is changed, but has exactly the same hash value as the corresponding block on the target volume, the block will not be transferred and the data will be lost. Using a good hash algorithm makes the probability of such data loss low, and using a hash function at least as robust as the SHA-256 algorithm makes the probability of data loss acceptably low for almost all users. Less robust algorithms may also be acceptable to many users.

In accordance with one or more embodiments of the present invention, hashes are stored in a hash file (not shown) on target datastore 50 (referring to FIG. 1). Further, in accordance with one or more such embodiments of the present invention, program code for an incremental backup procedure is installed on the source system (referring to FIG. 1, source system 10) where it can have the fastest access to all volumes of the source system storage (referring to FIG. 1, source system storage volume 30). As such, and in accordance with one or more such embodiments, hash calculations and comparisons are performed on the source machine (referring to FIG. 1, source system 10). Therefore, the source machine must retrieve the hash file from the target datastore (referring to FIG. 1, target datastore 50). For simplicity, one can describe the process as if the entire hash file is read from the target datastore at the beginning of an incremental backup procedure. In accordance with one or more such embodiments, program code for the incremental backup procedure can use a fixed-size buffer for the hash file to minimize memory requirements. In addition, as a further optimization, the code does not need to calculate the hash values for all source blocks in advance. Instead, the code can read source blocks in relatively small chunks, calculate hash values for all blocks in the chunk, and then, transfer changed blocks and hashes to the target datastore. In this way, data transfer to the target datastore can proceed in parallel with subsequent source block reads and hash calculations, thereby saving time overall.

Note, however, in accordance with one or more embodiments of the present invention, that the entire source volume (referring to FIG. 1, source system storage volume 30) must be read and new hashes for every used block must be calculated, regardless of how many blocks need to be transferred. Typically, the incremental backup procedure runs on the source system with local (or fast) access to the source volumes. While source volume access may be fast, the time required for reading all used blocks and calculating new hashes can be a limiting factor in determining how frequently incremental backups can be performed. An incremental backup can still take much less time than a full backup, because the time required for copying blocks and their associated hashes to the target datastore is typically much longer than that needed to read blocks and calculate hashes on the source system. Reducing the number of blocks that must be copied is therefore an important factor in minimizing the time required for a new backup.

In accordance with one or more embodiments of the present invention, the block hash file can be stored on the target datastore in a separate virtual disk called a hash disk. The hash disk can have a real master boot record (MBR) with exactly one partition covering the entire disk. Although, the hash disk need not be made visible to the guest operating system of any bootable VM, maintaining a valid MBR structure is useful to protect the hash data from accidental access.

Figure 2:
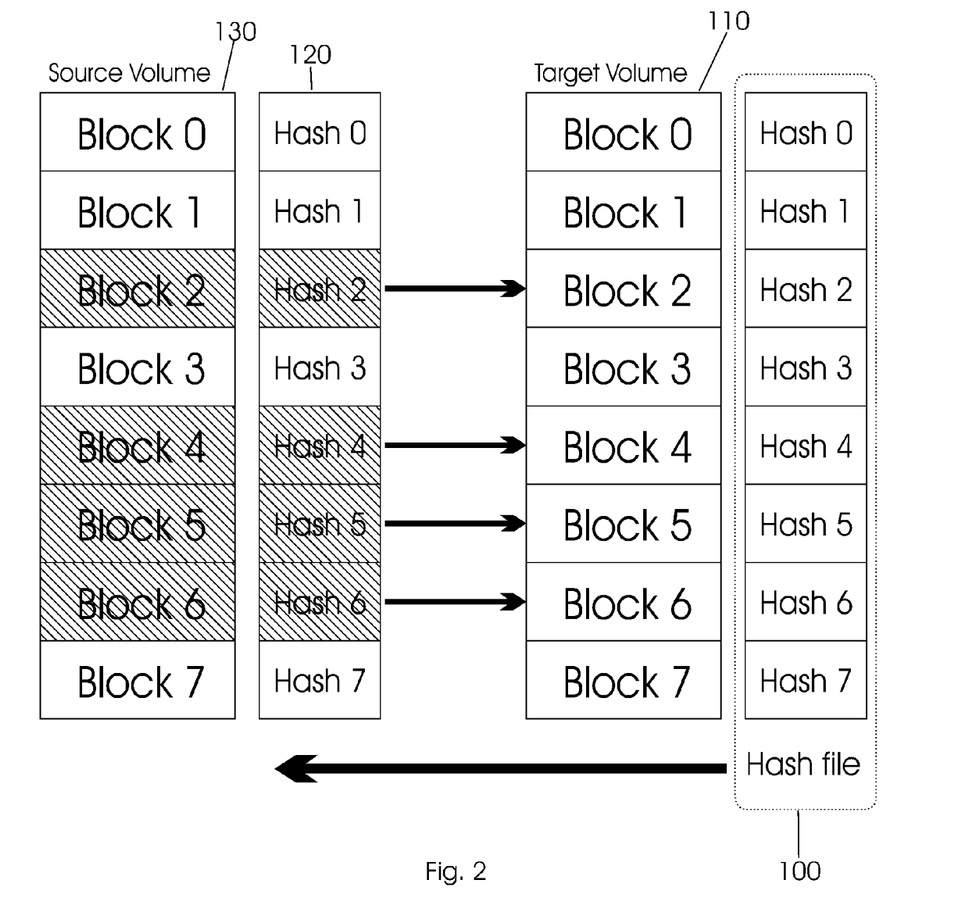
FIG. 2 provides a block diagram that helps illustrate an incremental backup procedure that operates in accordance with one or more embodiments of the present invention.

FIG. 2 provides a block diagram that helps to illustrate an incremental backup procedure that operates in accordance with one or more embodiments of the present invention. As indicated in FIG. 2, in accordance with the incremental backup procedure, hash file 100 for the latest prior backup on target volume 110 is retrieved from the target datastore and sent to the source machine. Then, in accordance with one or more such embodiments of the incremental backup procedure, matching hashes 120 are calculated for a snapshot of matching source volume 130. In the embodiment illustrated in FIG. 2, hashes for shaded blocks 2, 4, 5, and 6 are found to be different, and shaded blocks 2, 4, 5, and 6 are sent back to the target datastore along with their new hash values to complete an incremental update in accordance with the incremental backup procedure.

In accordance with one or more such embodiments, as successive incremental backup procedures are performed, it is not necessary to generate complete new copies of the backup VM. Rather, the backup VM can be managed using "VM snapshots" together with a set of "redo log files." A VM snapshot is taken (i.e., a timestamp is recorded) to establish the state of the backup VM at a point in time. Note that a "source snapshot" and a "VM snapshot" are used differently. Both start by setting a timestamp. As used in a backup procedure, a source snapshot (of a source machine volume) is temporary, and it is deleted after an incremental backup is completed. On the other hand, a VM snapshot is persistent and is not deleted unless and until it is no longer desired to retain a particular backup state (for example, after several months). Also, a VM snapshot manages the storage of pre- and post-snapshot data differently from the way a source snapshot manages the storage of pre- and post-snapshot data. In particular, after a VM snapshot is created, instead of copying pre-snapshot files to a "snapshot file" when changes or deletions occur, the pre-snapshot files are left untouched and the changes are written to one or more "redo log files." A redo log file is a collection of data in one or more files of a file system where file system writes are made after a VM snapshot. If a subsequent VM snapshot is created, a new redo log file is started at the time of that subsequent snapshot. It is then possible to "revert" a VM to any earlier state (i.e., a state marked by an earlier timestamp) by choosing which redo log file(s) to use. More generally, one can "switch" between any two snapshots by enabling and/or disabling the use of appropriate redo log file(s). The "active state" of a VM is the state represented by the snapshot reached after any reverting and switching which may have been conducted.

When a guest operating system of a VM requests a block of data, the virtualization software first checks the current redo log file. If the block of data is in the redo log file, the data are read and returned to the guest operating system. If not, the virtualization software next checks the immediate parent redo log file. This process of checking successive parent redo log files continues until the block of data is found. There is guaranteed to be a block of data available in a base VM snapshot if none is found in any of the subsequent redo log files (i.e., if no change has ever been made to that block). If and when it is necessary to revert to an earlier version, the virtualization software searches for blocks starting in the appropriate prior redo log file instead of the latest one, thereby ignoring changes which occurred after the timestamp of the earlier version.

In general, it is possible to create more than one redo log file associated with a particular VM snapshot. For example, after a first VM snapshot, one can create a first redo log file and even create subsequent snapshots and redo log files to track changes to a VM after the first VM snapshot. A user may then choose to revert to the first VM snapshot and start a second redo log file to track a different set of changes starting over from the first VM snapshot. To keep track of such multiple paths it is convenient to describe VM snapshots as arranged in a "snapshot tree," where the process of reverting a VM and starting an additional redo log file from a particular VM snapshot creates an additional branch of the tree.

In accordance with one or more embodiments of the present invention, changes associated with reconfiguring and customizing the latest copy of a source system volume to create a bootable VM must be undone before a subsequent incremental backup can be performed. In other words, the incremental backup should start from the most recent incremental or full copy of the source system volume, and the reconfiguration and customization steps should then be repeated on the updated copy of the source system volume. Any changes made to the incremental or full copy during a previous reconfiguration and customization would show up as differences that needed to be "corrected" on the next incremental backup, so they would be lost and have to be recreated anyway. Undoing those changes first can reduce the amount of data transferred during the incremental backup procedure. In accordance with one or more embodiments of the present invention, hashes used to identify changed files or blocks are not available in snapshots of bootable VMs, and one must revert to a state that includes the hash disk to make it available for retrieval by the incremental backup process.

The changes associated with reconfiguration and customization and hash disk removal can be stored in a redo log file. It is convenient, therefore, to describe both the copies of source system volumes and the backup VMs as part of a single snapshot tree. For convenience in describing portions of this snapshot tree, the term "VM snapshot" is used herein both to designate snapshots of bootable VMs and to designate snapshots of the copies of source machine volumes that may require reconfiguration and customization to create bootable VMs. Such copies or backups of source machines may not be VMs but rather intermediates in the process of creating VMs. Their snapshots are included in the snapshot tree so that they can be treated equally with the snapshots of bootable VMs as members of a family or tree of data connected by a series of change events, wherein some of those change events comprise the steps of reconfiguring and customizing necessary to create bootable VMs. Note that the changes in the hash file are also recorded in the snapshot tree and written into redo log files. As previously described in accordance with one or more embodiments of the present invention, this can be achieved by storing the hash file in a separate virtual disk. This virtual disk is associated with the backup VM whose changes are captured by the snapshots and redo log files outlined by the snapshot tree. This virtual disk, being present only in the intermediate states representing the copies of source volume data (i.e., those whose names begin with "Backup" as described below), is never actually accessible to the guest operating system of a bootable VM.

While embodiments of the present invention are described herein, wherein the hash data are stored in a hash file on a virtual disk associated with the backup VM, other configurations can also be used to store the hash data. For example, the hash data can be stored in storage separate from that used to store the backup VM, and the changes in the hash data from one incremental update to the next can be recorded by any suitable means and in any suitable location, either the same, or different from that used to record changes in the backup VM, as long as the incremental update procedure can access a set of hash data that can be properly matched to a set of blocks or files for a particular incremental update.

Figure 3:
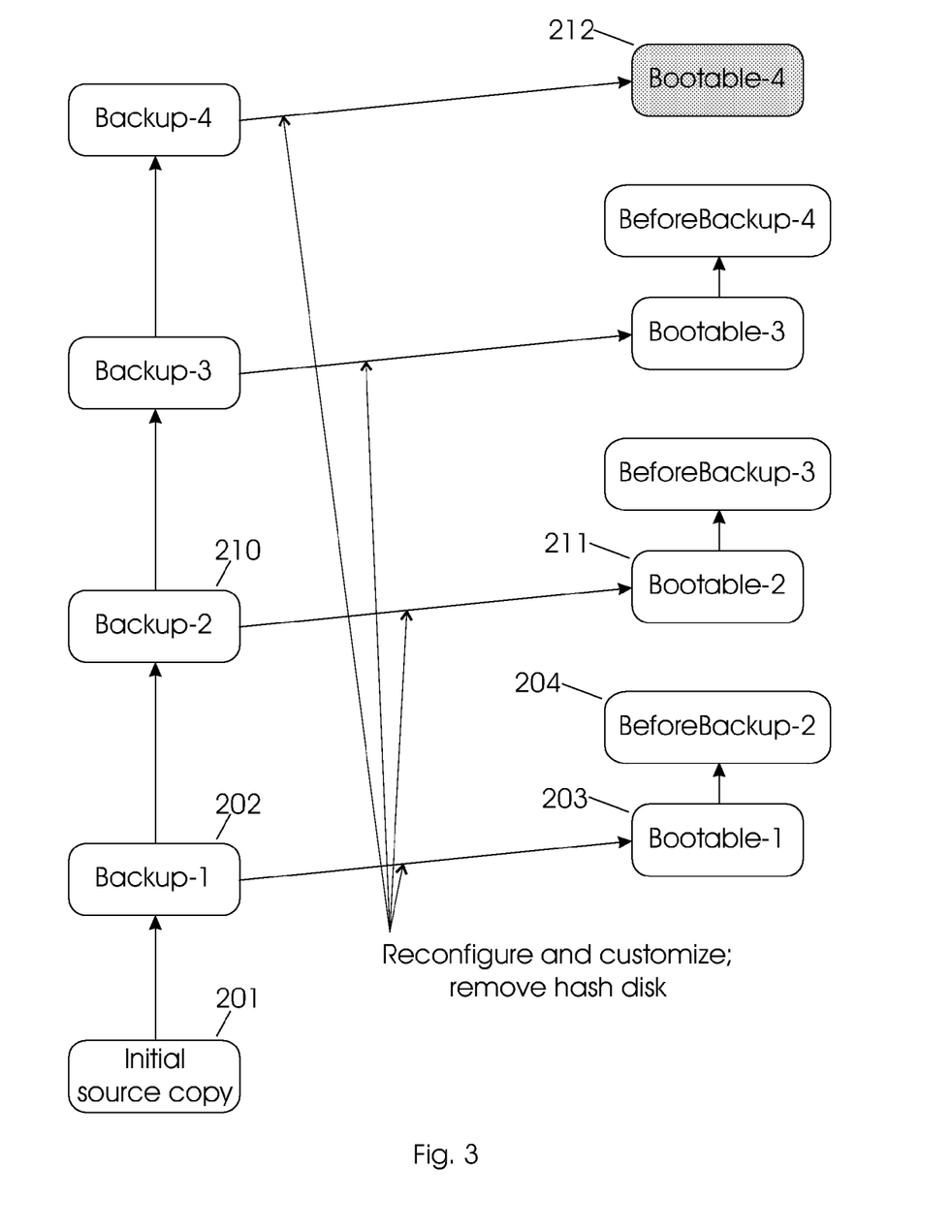
FIG. 3 provides a "snapshot tree" that shows all VM snapshots created after three incremental backup procedures have been performed in accordance with one or more embodiments of the present invention.

FIG. 3 shows a snapshot tree with all VM snapshots created after three incremental backup procedures have been performed in accordance with one or more embodiments of the present invention. The left-hand column (i.e., the "trunk") of the snapshot tree of FIG. 3 shows successive incremental backups of the source volume(s) where no reconfiguration or customization has been carried out thereon. In accordance with one or more embodiments of the present invention, these successive incremental backups of the source volumes are stored as successive VM snapshots of data which includes copies of source volumes and associated hash disks (if used). These VM snapshots are typically assigned names herein beginning with "Backup" as shown in FIG. 3. (Note the distinction between a "Backup VM snapshot" [uppercase 'B'] which is a VM snapshot of one of these copies of source system volumes and a "backup VM" [lowercase 'b'] which is a bootable VM, whose evolution can be represented with the aid of a snapshot tree.) As set forth above, successive Backup VM snapshots (timestamps) and redo log files capture changes from one backup to the next.

The right-hand column of the snapshot tree of FIG. 3 shows VM snapshots of bootable VMs. The "Bootable VM snapshots" are VM snapshots of the bootable VMs created when the hash disk has been removed and any required reconfiguration and customization has been carried out on one of the Backup VM snapshots. The "BeforeBackup VM snapshots" further capture any user-implemented changes applied to application programs which are installed on the bootable VM. In accordance with one or more embodiments of the present invention, a redo log file records file system changes required to convert a Backup VM snapshot on the left-hand column to a corresponding Bootable VM snapshot in the right-hand column. Further, as is described in more detail below, after each incremental backup procedure, the most recent (i.e., the top-most) Bootable or BeforeBackup VM snapshot (i.e., Bootable-4 212 in the right-hand column of FIG. 3) is the most up-to-date bootable VM snapshot, and it can be powered up if and when it is needed.

Initial source copy 201 in the left-hand column of FIG. 3 is a copy of the source system volume(s) specified for backup and a hash disk. If the source system is a VM, then initial source copy 201 may be a bootable VM; however, if the source system is a physical machine, it will not be. Nevertheless, even if the source system is a VM, some reconfiguration and customization may be required to enable it to run in a particular environment.

In accordance with one or more embodiments of the present invention, a first VM snapshot (Backup-1 202) is created after initial source copy 201 is complete. (For simplicity, time stamps mentioned below are replaced with sequence numbers.) This first VM snapshot is used as a base for subsequent VM snapshots, i.e., it is the base or root of the snapshot tree. Note that, in accordance with one or more such embodiments, forming a snapshot comprises setting a timestamp and allocating a redo log file—no entries in the redo log file are made at this point in time. In accordance with one or more such embodiments, the name of the snapshot can include an appended timestamp to make it unique, although other algorithms for creating unique names can also be used. For example, and without limitation, any VM snapshot on the left-hand side of FIG. 3 can be named "Backup-[timestamp]." Each Backup VM snapshot is used as a starting point for the next incremental backup via a set of redo log files. Each backup VM snapshot is associated with an additional redo log file (on a different branch of the snapshot tree) for creating a corresponding bootable VM. The Backup VM snapshots are typically not bootable and should never be booted and run.

In accordance with one or more embodiments of the present invention, to create a bootable backup VM, the hash disk is removed from Backup-1 (VM snapshot) 202 and any necessary reconfiguration and customization transformations are applied thereto. As set forth above, these reconfiguration and customization transformations cause change blocks to be created, and in accordance with one or more embodiments of the present invention, these change blocks are stored in the redo log file created at the time of Backup-1 VM snapshot 202. In accordance with one or more such embodiments, at the time every VM snapshot is created, a new redo log file is associated with it to record changes that occur after the time of the snapshot. As a final step in preparing a bootable VM, once the necessary reconfiguration and customization transformations are complete, a Bootable VM snapshot (for example, Bootable-1 (VM snapshot) 203 of FIG. 3) is created with a unique name. For example, this Bootable VM snapshot can be named "Bootable-[timestamp]," where the timestamp would be the same as that of the corresponding Backup VM snapshot since they reference the same backup event. Thus, for every incremental backup VM created, at least two snapshots are created, one before and one after the reconfiguration and customization (and hash disk removal) procedure.

In accordance with one or more embodiments of the present invention, when it is time to perform the next incremental backup procedure: (a) the snapshot tree is "reverted" (i.e., the VM represented by the snapshot tree is reverted) to the most recent Backup VM snapshot (for example, Backup-1 202 of FIG. 3); (b) a new redo log file is created for that Backup VM snapshot; (c) a new source snapshot is created to freeze the state of the source system volume(s) for the incremental backup (the source system may continue to modify the source system volume(s), and post-snapshot modifications will be captured in the following incremental backup); (d) the hash file from the most recent Backup VM snapshot is transferred to the source system; (e) hashes from the hash file are compared to newly computed hashes for the source system, and change blocks and hashes are transferred and written into the new redo log file; (f) when all change blocks and hashes are transferred, a new Backup VM snapshot and redo log file (for example, Backup-2 210 of FIG. 3) are created; (g) the hash disk is removed, reconfiguration and customization transformations are applied thereto to the new Backup VM to create a new bootable VM and (h) a VM snapshot (for example, Bootable-2 211 of FIG. 3) is created of the new bootable VM.

A user or system administrator can boot from a Bootable VM snapshot to test it to make sure that it works properly. For example, the user may need to test applications to identify scripts needed to prepare the VM for a takeover in the event the source system goes down. Such scripts may be needed to adapt particular applications to the environment in which the VM will run in the event that they were not automatically adapted by the reconfiguration and customization transformation steps that were a part of creating the bootable VM. Once the reconfiguration, customization, and adaptation steps are complete, it is generally possible to power on the resulting VM quickly, and the overall system downtime from a failure of the source system to the availability of a replacement VM can be just a few minutes.

Once testing is complete, the bootable VM is typically shut down until it is needed for recovery purposes. Further, any scripts that were created to adapt applications can be recorded for reuse in conjunction with future Bootable VM snapshots. In some cases, it is also possible to implement the functionality of the scripts directly in the source machine so that they are no longer needed.

To prevent loss of user changes to a Bootable VM snapshot, in accordance with one or more embodiments of the present invention, the incremental backup procedure creates yet another Bootable VM snapshot, referred to herein as BeforeBackup VM snapshot (for example, BeforeBackup-2 204 of FIG. 3), on top of a Bootable VM snapshot (for example, Bootable-1 203 of FIG. 3) before reverting to the latest Backup snapshot. The BeforeBackup VM snapshot can be given another unique name such as "BeforeBackup-[timestamp]." The timestamp for this snapshot can be the same as the timestamp for the Backup VM snapshot that is about to be created. However, in accordance with one or more such embodiments, in certain cases, it may not be necessary to create the BeforeBackup VM snapshot. For example, if the Bootable VM snapshot has never been booted, or if it has, but it was only tested but not reconfigured in any way, then no changes need to be captured. Since a VM snapshot will have an associated redo log file that records all changes that take place after the snapshot time, if the redo log file for the current Bootable VM snapshot is empty, there is no need to create the corresponding BeforeBackup VM snapshot. However, it is not always straightforward to determine whether the redo log file for a snapshot is empty or not. To work around this, in accordance with one or more embodiments of the present invention, the incremental backup procedure can analyze the current Bootable VM snapshot before starting an incremental backup procedure. If it can determine that the current Bootable VM snapshot is not the same as one of the Bootable VM snapshots, then a BeforeBackup VM snapshot is needed. Some systems provide a "changeID" for a disk, indicating which files have changed after a particular timestamp, or alternatively, a list of change blocks after a particular timestamp. If one of these resources is available, the incremental backup procedure can skip creating the BeforeBackup VM snapshot if the current Bootable VM snapshot has never been modified (i.e., if its redo log file has not been changed since it was created).

Figure 4:
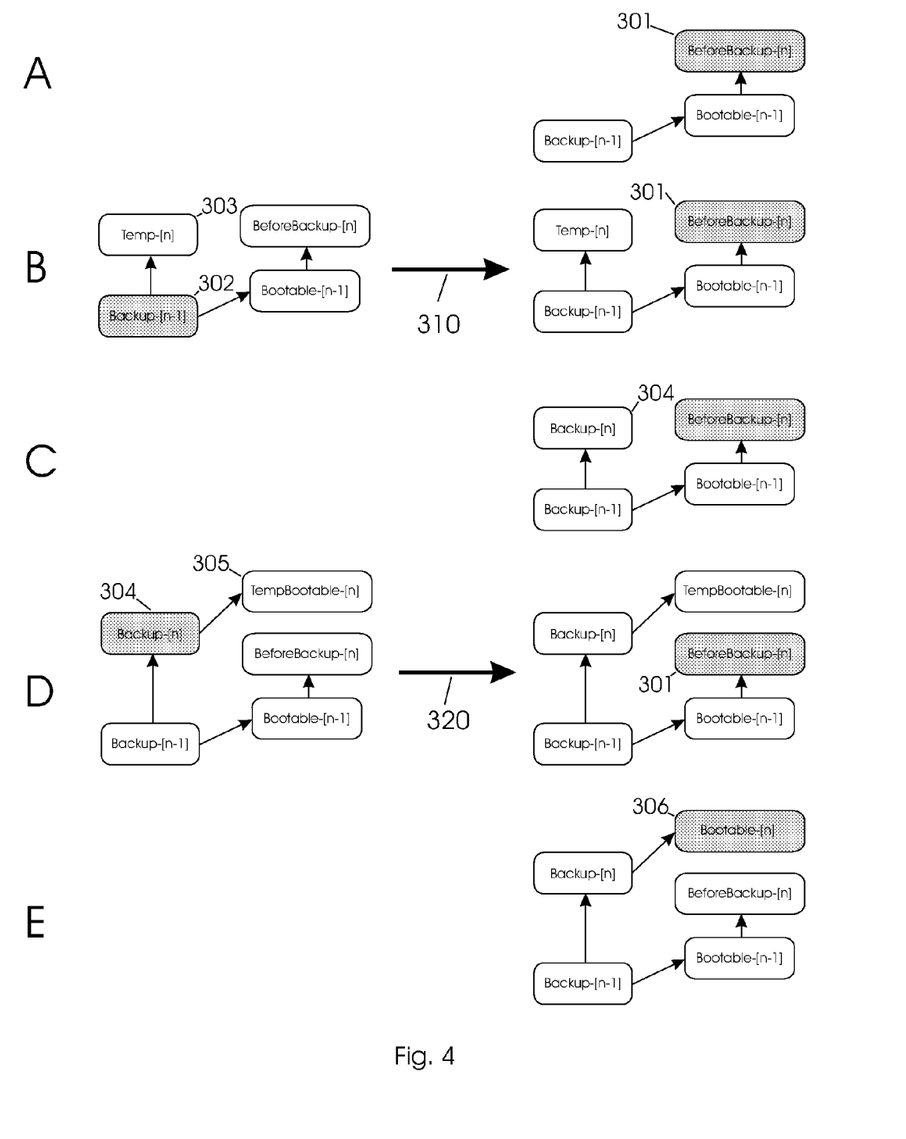
FIG. 4 is a sequence of frames that show changes to a portion of a VM snapshot tree during one incremental backup procedure step that operates in accordance with one or more embodiments of the present invention.

As described so far, during the time that an incremental backup procedure is being carried out, for example, by transferring the hash file and copying updated files or blocks, the "active state" of the snapshot tree (i.e., the active state of the VM represented by the snapshot tree) is that of the most recent Backup VM snapshot. As such, that state does not represent a bootable VM. It can take significant time to transfer all change blocks for the incremental backup. As such, it can be desirable to have a bootable VM ready to use in the event of source system failure during the incremental backup procedure. To provide such a bootable VM, in accordance with one or more embodiments, the active state of the snapshot tree is reverted and switched so as to keep it in the latest bootable state as much as possible. Essentially, the state of the snapshot tree is reverted to the most recent Backup VM snapshot only to create a new temporary VM snapshot, and then immediately switched back to the current Bootable or BeforeBackup VM snapshot. Once the next set of modifications is written into the redo log file for the temporary snapshot, that temporary snapshot can be renamed, and the next step (if any) can proceed. This sequence is illustrated in FIG. 4, where steps to create a "Bootable-[n]" VM snapshot are illustrated. In particular, FIG. 4 shows a sequence of steps and sub-steps as explained below that illustrate a portion of a backup VM snapshot tree during one incremental backup procedure that operates in accordance with one or more embodiments of the present invention. Each of the five lettered steps of FIG. 4 comprises either one or two sub-steps, each of which illustrates a segment of the snapshot tree of FIG. 3. At each step or sub-step, the active state of the snapshot tree is marked by shading. Steps B and D illustrate the brief reverting and immediate switching back to the most recent bootable state.

As shown in FIG. 4, first, at Step A, "Before-Backup-[n]" (VM snapshot) 301 is created from Bootable [n−1]. Next, at Step B, the active state of the snapshot tree is reverted to "Backup-[n−1]" 302 and new VM snapshot 303 (which is called "Temp-[n]") is created. Then, as indicated by arrow 310, the active state of the snapshot tree is switched immediately back to Before-Backup-[n] 301. Next, at Step C, the incremental backup procedure copies change blocks and hashes to the redo log file for Temp-[n], which is then renamed "Backup-[n]" 304. Next, at Step D, the active state of the snapshot tree is reverted to Backup-[n] 304, and another new Bootable VM snapshot 305 (which is called "TempBootable-[n]") is created. Then, as indicated by arrow 320, the active state of the snapshot tree is again switched immediately back to Before-Backup-[n] 301. Next, at Step E, reconfiguration and customization steps necessary to create "Bootable-[n]," plus the removal of the hash disk, are implemented by writing to the redo log file for TempBootable-[n], which is then renamed to "Bootable-[n]" 306. Finally, also at Step E, the active state of the snapshot tree is switched to Bootable-[n] 306, and the incremental backup procedure is complete.

As one can readily appreciate from the above, the use of temporary VM snapshots, together with reverting and switching of the active state of the snapshot tree, allows the active state of the snapshot tree to remain in the most recent bootable state for all but brief moments when temporary VM snapshots are created. Further, if, for some reason, an incremental backup procedure fails to complete, either a "Temp" or a "TempBootable" snapshot will exist, and suitable steps can be taken to redo or complete the incremental backup procedure.

Referring to FIG. 3, in accordance with one or more embodiments of the present invention, a hash disk is present only in Backup VM snapshots on the left-hand side of the snapshot tree, and all snapshots on the right-hand side of the snapshot tree do not include a hash disk. In addition, a VM user cannot change or even see the hash disk, since a VM user always uses a VM snapshot from the right-hand side. Further, if the VM user manually switches the active state of the snapshot tree to one of the Backup VM snapshots, the resulting VM will normally not be bootable. Even if the user manages to boot a VM from one of the Backup VM snapshots, any changes will be automatically discarded the next time an incremental backup is made, since the changes would not be captured in any redo log file. As such, the incremental backup procedure is resistant to possible accidental or malicious changes to its stored data.

In accordance with one or more embodiments of the present invention, by maintaining a snapshot tree, a user can boot a VM using any "Bootable" or "BeforeBackup" VM snapshot. Typically, the selection of a particular snapshot to use is facilitated by a graphical user interface which can present the user with appropriate guidance and choices. This can be important for recovering from a problem that is not detected immediately. For example, if the source system is infected with a virus, but the presence of the virus is discovered only several days later, the virus is likely to be present in all recent incremental backups. The user can boot preceding snapshots, one at a time, until one is found which does not contain the virus.

Typically, users do not need to keep snapshots indefinitely. The incremental backup procedure can limit the number of "Backup" VM snapshots created to a user-selectable number. A typical default number of incremental backups can be set to 10, for example, or the number of incremental backup procedures scheduled in some time interval such as one or several days. Alternatively, shorter- and longer-term limits can be set, for example, by keeping up to a selectable number of most recent backups plus one backup per day for a selectable number of days. All Backup VM snapshots beyond these limits can be collapsed after each successful incremental backup procedure, and the corresponding Bootable and BeforeBackup VM snapshots can be automatically removed and discarded. In accordance with one or more embodiments of the present invention, selection of user-configurable options can be facilitated by a graphical user interface providing guidance and selection options for configuration and customization of backup procedure options.

In one or more embodiments, hashes are calculated to determine which blocks to copy. However, the hash-based approach to determining which blocks need to be copied requires an entire source volume to be read into memory so that the hash value of each block can be calculated. Obviously, only used blocks need to be read, but even just the used blocks can constitute a large amount of data to read. For a large disk it can take a long time to read all the data. Further, the time required is proportional to the total size of all files on the volume, not the size of modified blocks. Thus, source volume hash calculations can prevent the incremental backup procedure from achieving an acceptably small recovery point objective (i.e., RPO, which is an amount of data loss measured in time that is a target maximum time). For backup operations, RPO determines an acceptable maximum interval between consecutive backups.

In accordance with one or more embodiments of the present invention, a bitmap driver is used to determine which blocks to copy. The bitmap driver can be run on the source system to maintain a bitmap that records all blocks on all volumes that have been modified since a particular start time. Multiple bitmaps can be maintained to track changes from different start times. The incremental backup procedure can use these bitmaps to determine which blocks need to be transferred instead of reading every used block on the source volume(s) and calculating hashes. The time required to do so will depend only on the amount of changed data, and thus a much shorter RPO can be achieved.

Even if the process uses a bitmap driver, it can still be advantageous to calculate and maintain hash values for all blocks so that the process can fall back to the hash-based method of determining changed blocks in case the bitmap driver is not available or malfunctions. For the incremental backup procedure to use the information provided by the bitmap driver, the driver must guarantee that if a block is marked as unmodified in the driver's bitmap, then the block has indeed not been modified since the time the driver started tracking changes. Without this guarantee, the incremental backup procedure cannot produce a consistent backup image of the source system. In most cases, the driver can and does so guarantee, but there are several cases when the driver can potentially miss a write operation and fail to provide the necessary guarantee. For example, one implementation of the bitmap driver keeps the bitmap of modified blocks in volatile memory. In this implementation, if the source system is rebooted or crashes, the driver cannot provide consistent information, and should not be relied upon. The driver implementation could be changed to have persistent bitmaps preserved across reboots, but it would still be vulnerable to system crashes. A system crash could damage the persistent bitmap and even the underlying file system, thereby making the bitmap unreliable. It should be noted that non-persistent bitmaps in volatile memory are faster to calculate and do not add much overhead to the source system. Persistent bitmaps would require the driver to write information to the file system (typically located on a disk drive), which would drain more resources from the source system.

In accordance with one or more embodiments of the present invention, the bitmap driver runs when the system starts, and continues running until the system is shut down or restarted. However, before the operating system is started, the system is controlled by the BIOS, and the driver is not yet running. Most users do nothing during this time, but it is possible to boot into a different operating system either from a CD or a network. There is no guarantee that this alternate operating system (or the user) will not attempt to write to the volumes that should be monitored by the bitmap driver. If this happens, the information provided by the bitmap driver will be inconsistent and should not be used for incremental backup.

The hash-based approach is operating system agnostic, does not require exclusive control of the source system, can handle any reboots/crashes of the source system and any multiboot environment, and places no strain on the source system between incremental backups. However, because it requires all used blocks to be read for each incremental backup, it typically cannot achieve as small an RPO as the bitmap driver.

In contrast, the bitmap driver approach does not require reading all used blocks, reports changed blocks directly, and can achieve a very small RPO. At the same time, it requires operating-system-specific drivers, may be affected by reboots, drains resources from the source between incremental backup procedures (even more so for persistent bitmaps), cannot handle a multiboot environment, and cannot handle crashes of the source system.

The potential for a very short RPO makes it desirable to use a bitmap driver whenever possible. However, given the number of possible failure modes, it is typically not desirable to rely on a bitmap driver exclusively. In accordance with one or more embodiments of the present invention, the incremental backup procedure can use the bitmap driver whenever it can be relied on and fall back to the hash-based approach to guarantee the consistency of each incremental backup if any events may have occurred to invalidate the bitmap. The incremental backup procedure can check for the occurrence of any reboot events or other events that could invalidate the bitmap, and if any such event has occurred since the last incremental backup, the incremental backup procedure can use the hash data instead.

Figure 5:
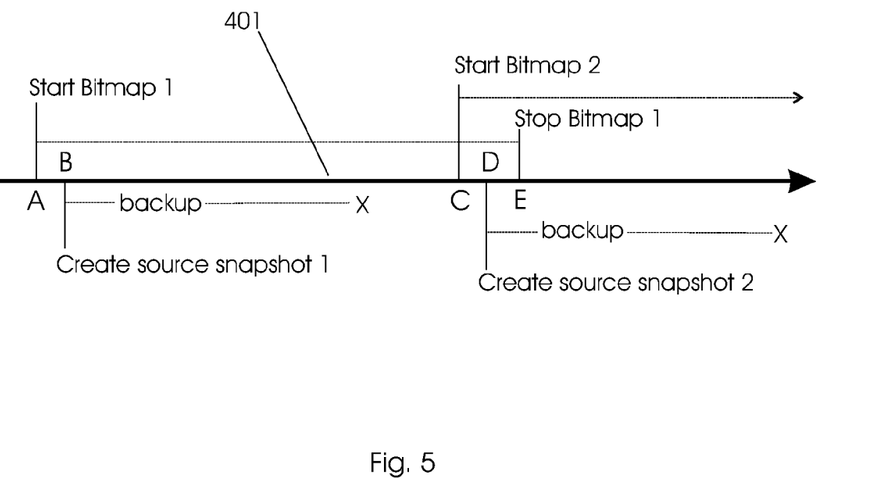
FIG. 5 is a timeline that helps illustrate a method of starting and stopping storing change bitmaps when using a bitmap driver in accordance with one or more embodiments of the present invention.

In accordance with one or more embodiments of the present invention, a bitmap driver records a change state of blocks after a particular start time. When used with incremental backups, a new start time is set and a new bitmap is created for each incremental backup. Further, the previous bitmap is frozen ("stopped"). Proper sequencing of starting and stopping times for each bitmap relative to the source snapshot times is important to ensure that all changes are captured. Typical CPUs simulate simultaneous parallel computation by timesharing, and it is possible that changes could be made to a source volume by another process in between the time that one bitmap was frozen and the next was started. One embodiment of a method that ensures all changes are captured is described below in conjunction with timeline 401 of FIG. 5. As shown in FIG. 5, the time intervals of successive bitmaps overlap slightly. In particular, as shown in FIG. 5, Bitmap 1 is started at time A immediately prior to the creation of a source snapshot used for one full or incremental backup at time B. (While the incremental backup procedure does nothing between time A and time B, it is possible that other running processes may cause a finite delay between time A and time B.) Thereafter, for each succeeding incremental backup, a new bitmap is created. In particular, Bitmap 2 is started at time C immediately prior to the creation of a new source snapshot for the next incremental backup at time D. As further shown in FIG. 5, changes to the previous bitmap, i.e., Bitmap 1, are stopped (i.e., no more changes are captured) at time E which is immediately after the creation of the new source snapshot at time D. While the time interval between time C and time E is typically short, it is non-zero, and the source system may be busy with other applications that can modify a few blocks on one or more source volumes during that interval. Because there can be a slight overlap in the change information stored in successive bitmaps, there can be a slight duplication of blocks transferred during successive incremental backups. The number of such duplicate block transfers will generally be small compared to the total number of blocks transferred, so the additional time required will be negligible.

It is understood that all file systems, volumes, snapshots, process code and the like are stored in physical data storage media. In certain cases, such media may be virtualized, but all virtualized data stores are ultimately realized in physical data storage media. Such media may be any available computer-readable storage devices such as but not limited to magnetic disks such as but not limited to floppy disks, fixed hard disk drives, and removable hard disk drives; optical storage media such as but not limited to CD-ROMs, DVD-ROMs, and bar codes; and semiconductor memory devices such as but not limited to RAM, ROM, and flash memory devices.

Unless specifically stated otherwise above, discussions utilizing terms such as, for example and without limitation, "accessing," "scanning," "determining," "applying," "generating," "utilizing," "storing," "causing," "coupling," "employing," "performing," "providing," "interfacing," "detecting," "creating," "coordinating," "scheduling," and "updating," or the like, refer to the actions and processes of a computer system, or similar electronic computing devices. The computer system or similar electronic computing device manipulates and transforms data represented as physical (electronic) quantities within the computer system's registers and memories into other data similarly represented as physical quantities within the computer system memories or registers or other such information storage, transmission, or display devices.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method for providing incremental backups for a source computing machine, the method comprising:
   (a) creating a first backup snapshot comprising a virtual machine (VM) snapshot of an initial copy of a source computing machine volume, wherein said VM snapshot comprises a timestamp and a first redo log file;
   (b) reconfiguring and customizing said first backup snapshot to create a first bootable VM, writing changes associated with said reconfiguring and customizing into said first redo log file, then creating a first bootable snapshot comprising a VM snapshot of said first bootable VM, wherein said VM snapshot of said first bootable VM comprises a timestamp for said first bootable VM and a redo log file;
   (c) performing an incremental update of said first backup snapshot or a subsequent backup snapshot, then creating a subsequent backup snapshot comprising a VM snapshot of said incremental update, wherein said VM snapshot of said incremental update comprises a timestamp for said incremental update and a redo log file; and
   (d) reconfiguring and customizing said subsequent backup snapshot to create a subsequent bootable VM, then creating a subsequent bootable snapshot comprising a VM snapshot of said subsequent bootable VM, wherein said VM snapshot of said subsequent bootable VM comprises a timestamp for said subsequent bootable VM and a redo log file.

2. The method of claim 1 wherein said first or subsequent bootable VM is booted and tested, and, optionally, applications are reconfigured.

3. The method of claim 2 further comprising creating a before-backup snapshot comprising a VM snapshot of said first or subsequent bootable VM.

4. The method of claim 1 further comprising repeating steps (c) and (d) one or more times.

5. The method of claim 1 wherein performing an incremental update comprises:
   dividing said source computing machine volume into a set of portions;
   creating a first source snapshot of said source computing machine volume;
   calculating a first set of hashes for each portion in said set of portions for the state of said source computing machine volume at the time of said first source snapshot;
   storing said first set of hashes in a file;
   creating a second source snapshot of said source computing machine volume at the time of commencement of said incremental update;

calculating a second set of hashes for each portion in said set of portions for the state of said source computing machine volume at the time of said second source snapshot;

comparing said first set of hashes to said second set of hashes to identify changed portions; and copying said changed portions and their hashes to a second redo log file for said first backup snapshot.

6. The method of claim 5 wherein said portions comprise files.

7. The method of claim 5 wherein said portions comprise blocks of a volume.

8. The method of claim 7 wherein said blocks are equal in size to the cluster size for the volume, except for an optional irregular-sized block at the beginning.

9. The method of claim 8 wherein said irregular-sized block is sized so that block boundaries align with cluster boundaries.

10. The method of claim 7 wherein groups of eight blocks are aligned except for a single shorter group of blocks.

11. The method of claim 5 wherein said file is removed when reconfiguring and customizing said subsequent backup snapshot to create a subsequent bootable VM.

12. The method of claim 5 wherein hashes are calculated using the SHA-256 algorithm.

13. The method of claim 1 wherein performing an incremental update comprises:

dividing said source computing machine volume into a set of portions;

installing and running a driver on said source machine which records which portions have changed after particular times in memory segments; and setting said driver to record changed portions from the time of creation of said first source snapshot.

14. The method of claim 13 further comprising:

copying said changed portions and their hashes to a second redo log file for said first backup snapshot.

15. The method of claim 13 wherein each memory segment comprises a bitmap wherein each bit in said bitmap records whether or not a particular portion of said set of portions has been changed.

16. The method of claim 13 wherein said setting further comprises:

starting to record new changes in a second memory segment;

creating said source snapshot; and stopping the recording of changes in a first memory segment.

17. The method of claim 13 further comprising:

creating a first source snapshot of said source computing machine volume;

calculating a first set of hashes for each portion in said set of portions for the state of said source computing machine volume at the time of said first source snapshot;

storing said first set of hashes in a file on said target datastore;

determining if the data in said memory segments could have been corrupted due to source system reboots or crashes, and if corruption could have occurred:

creating a second source snapshot of said source computing machine volume at the time of commencement of said incremental update;

calculating a second set of hashes for each portion in said set of portions for the state of said source computing machine volume at the time of said second source snapshot;

comparing said first set of hashes to said second set of hashes to identify changed portions; and copying said changed portions and their hashes to a second redo log file for said first backup snapshot.

18. The method of claim 1 wherein performing an incremental update further comprises:

reverting said bootable VM to said first backup snapshot;

creating a temporary VM snapshot as a copy of said first backup snapshot;

switching said bootable VM to said first bootable snapshot;

creating said VM snapshot of an incremental update of the most recent backup snapshot by writing changes to a redo log file created at the time of said temporary snapshot; and designating said temporary VM snapshot to be said subsequent backup snapshot; and wherein reconfiguring and customizing further comprises:

reverting said bootable VM to said subsequent backup snapshot;

creating a second temporary VM snapshot as a copy of said subsequent backup snapshot;

switching said bootable VM to said first bootable snapshot;

writing the changes associated with said reconfiguring and customizing to a redo log file created at the time of said second temporary VM snapshot; and designating said second temporary VM snapshot to be said subsequent bootable snapshot; and the method further comprising:

switching said bootable VM to said subsequent bootable snapshot.

* * * * *